(12) United States Patent
Park (10) Patent No.: US 10,534,210 B2
(45) Date of Patent: Jan. 14, 2020

(54) CURVED LIQUID CRYSTAL DISPLAY DEVICE

(71) Applicant: LG Display Co., Ltd., Seoul (KR)

(72) Inventor: Se-Hong Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 21 days.

(21) Appl. No.: 14/723,637

(22) Filed: May 28, 2015

(65) Prior Publication Data

US 2015/0362788 A1    Dec. 17, 2015

(30) Foreign Application Priority Data

Jun. 17, 2014    (KR) .................. 10-2014-0073377

(51) Int. Cl.
*G02F 1/1333*    (2006.01)
*F21V 8/00*    (2006.01)

(52) U.S. Cl.
CPC .. *G02F 1/133308* (2013.01); *G02F 1/133305* (2013.01); *G02B 6/0045* (2013.01)

(58) Field of Classification Search
CPC ......... G02F 1/133308; G02F 1/133305; G02B 6/0045; G06F 1/1652; H04M 1/0268
See application file for complete search history.

(56) References Cited

U.S. PATENT DOCUMENTS

| | | | |
|---|---|---|---|
| 9,366,802 B2* | 6/2016 | Lee ....................... | G02B 6/0081 |
| 2002/0003711 A1 | 1/2002 | Hashimoto et al. | |
| 2005/0062901 A1* | 3/2005 | Inoue ................ | G02F 1/133308 349/58 |
| 2009/0122476 A1* | 5/2009 | Won .................. | G02F 1/133308 361/679.21 |
| 2013/0227829 A1* | 9/2013 | Hsu ................... | G02F 1/133308 29/428 |
| 2013/0321740 A1* | 12/2013 | An ....................... | H05K 5/0217 349/58 |

(Continued)

FOREIGN PATENT DOCUMENTS

| | | |
|---|---|---|
| CN | 1987569 A | 6/2007 |
| CN | 103424913 A | 12/2013 |
| CN | 103489371 A | 1/2014 |

(Continued)

OTHER PUBLICATIONS

Notification of the First Office Action dated Nov. 14, 2017 from the State Intellectual Property Office of People's Republic of China in counterpart Chinese application No. 201510329317.4.

*Primary Examiner* — Nathanael R Briggs
(74) *Attorney, Agent, or Firm* — Morgan, Lewis & Bockius LLP (57) ABSTRACT

The present application provides a curved liquid crystal display device. The curved liquid crystal display device includes a liquid crystal panel including a first portion and second portions at both sides of the first portion, where the first portion has a first curvature larger than a reference curvature, and each of the second portions has a second curvature smaller than the first curvature; and a bottom frame covering a rear surface of the liquid crystal panel and including a third portion and fourth portions at both sides of the third portion, where the third portion has a third curvature larger than the reference curvature, and each of the fourth portions has a fourth curvature smaller than the reference curvature.

14 Claims, 9 Drawing Sheets

(56) References Cited

U.S. PATENT DOCUMENTS

2014/0092356 A1* 4/2014 Ahn ................. G02F 1/1339
                                                    349/153
2014/0247405 A1* 9/2014 Jin .................. H01L 51/524
                                                    349/12

FOREIGN PATENT DOCUMENTS

| CN | 103547109 A | 1/2014 |
| TW | 201102703 A | 1/2011 |

* cited by examiner

CURVED LIQUID CRYSTAL DISPLAY DEVICE

The present application claims the benefit of Korean Patent Application No. 10-2014-0073377 filed in Korea on Jun. 17, 2014, which is hereby incorporated by reference.

BACKGROUND OF THE INVENTION

Technical Field

The present invention relates to a liquid crystal display (LCD) device, and more particularly, to a curved LCD device.

Discussion of the Related Art

As society has entered in earnest upon the information age, various display devices for displaying images have been required. Flat panel display devices, such as an LCD device, a plasma display panel (PDP), and an organic light emitting diode (OLED) display device, tend to have excellent capabilities of a thin profile, light weight, low power consumption, and so on, relative to a cathode ray tube (CRT) device. Such devices have been widely researched and developed to replace the CRT display.

Among these devices, the LCD device has advantages in weight, size, and power consumption. The LCD device is therefore widely used. The LCD device typically includes a liquid crystal panel and a backlight unit. The backlight unit is disposed under the liquid crystal panel and provides light to the liquid crystal panel. To display an image, the LCD device uses optical anisotropy and polarization properties of liquid crystal molecules in the liquid crystal panel. The liquid crystal molecules have a definite alignment direction as a result of their thin and long shapes. The alignment direction of the liquid crystal molecules can be controlled by application of an electric field across the liquid crystal molecules.

As the intensity or direction of the electric field is changed, the alignment of the liquid crystal molecules also changes. Because incident light is refracted based on the orientation of the liquid crystal molecules due to the optical anisotropy of the liquid crystal molecules, images can be displayed by controlling light transmissivity.

Because the LCD device including a thin film transistor (TFT) as a switching element, referred to as an active matrix LCD (AM-LCD) device, has excellent characteristics with respect to high resolution and displaying moving images, the AM-LCD device has been widely used.

However, as LCD displays become larger, there is an issue regarding a deviation in viewing distance in the related art LCD device.

Figure 1:
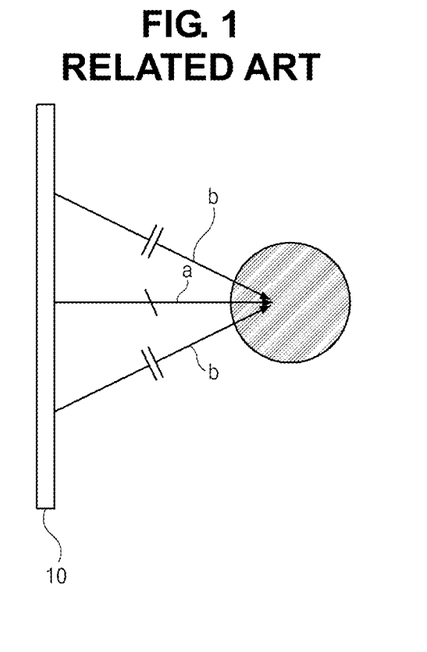
FIG. 1 shows a related art LCD device.

For example, with reference to FIG. 1, which shows are related art LCD device, there is a difference between a first distance "a" from a main viewing point to a center of the LCD device 10 and a second distance "b" from the main viewing point to a side of the LCD device 10. This distance deviation in the flat type display device can lead to a decrease in viewing quality.

SUMMARY

Accordingly, embodiments of the present invention are directed to a curved LCD device that substantially obviates one or more of the problems due to limitations and disadvantages of the related art.

An object of the present invention is to provide a curved LCD device capable of preventing a distance deviation.

An object of the present invention is to provide a curved LCD device capable of reducing a light leakage problem.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a curved liquid crystal display device comprises a liquid crystal panel including a first portion and second portions at both sides of the first portion, wherein the first portion has a first curvature larger than a reference curvature, and each of the second portions has a second curvature smaller than the reference curvature; and a bottom frame covering a rear surface of the liquid crystal panel and including a third portion and fourth portions at both sides of the third portion, wherein the third portion has a third curvature larger than the reference curvature, and each of the fourth portions has a fourth curvature smaller than the reference curvature.

In another aspect, a curved liquid crystal display device comprises a liquid crystal panel having a curved shape along one direction; a side frame covering a side surface of the liquid crystal panel; and a cushion pad disposed along the one direction between an end of the liquid crystal panel and the side frame.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of embodiments of the invention.

DETAILED DESCRIPTION OF THE EXAMPLE EMBODIMENTS

Reference will now be made in detail to the example embodiments, examples of which are illustrated in the accompanying drawings.

Figure 2:
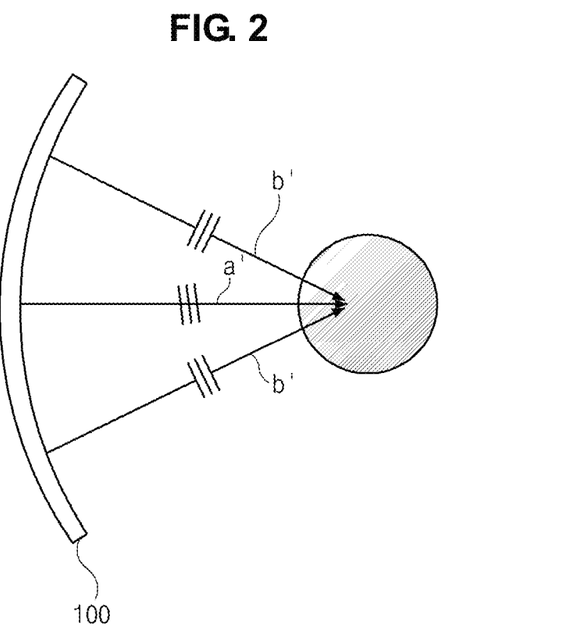
FIG. 2 is a schematic view of a curved LCD device according to a first embodiment of the present invention.

FIG. 2 is a schematic perspective view of a curved LCD device according to a first embodiment of the present invention. As shown in FIG. 2, a curved LCD device 100 has a curved shape. For example, a flat display device is curved by a pre-determined curvature with respect to a center of the display device to have a curved shape.

Accordingly, a first distance a' from a main viewing point to a center of the LCD device 100 may be substantially equal to a second distance b' from the main viewing point to a side of the LCD device 100, such that there is substantially no distance deviation. As a result, a sense of immersion is improved.

Figure 3:
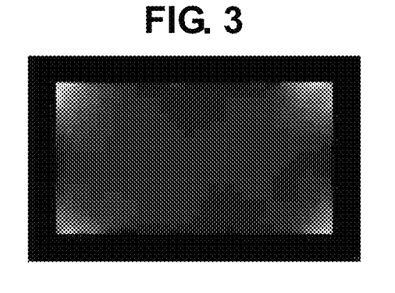
FIG. 3 is a view showing a possible light leakage in the curved LCD device according to the first embodiment of the present invention.

However, because the curvature of the curved LCD device 100 according to the first embodiment of the present invention may be artificially formed, light leakage may be strongly generated at the four corners of the display, as shown in FIG. 3. FIG. 3 is a view showing the possible light leakage in the curved LCD device according to the first embodiment of the present invention.

Figure 4A:
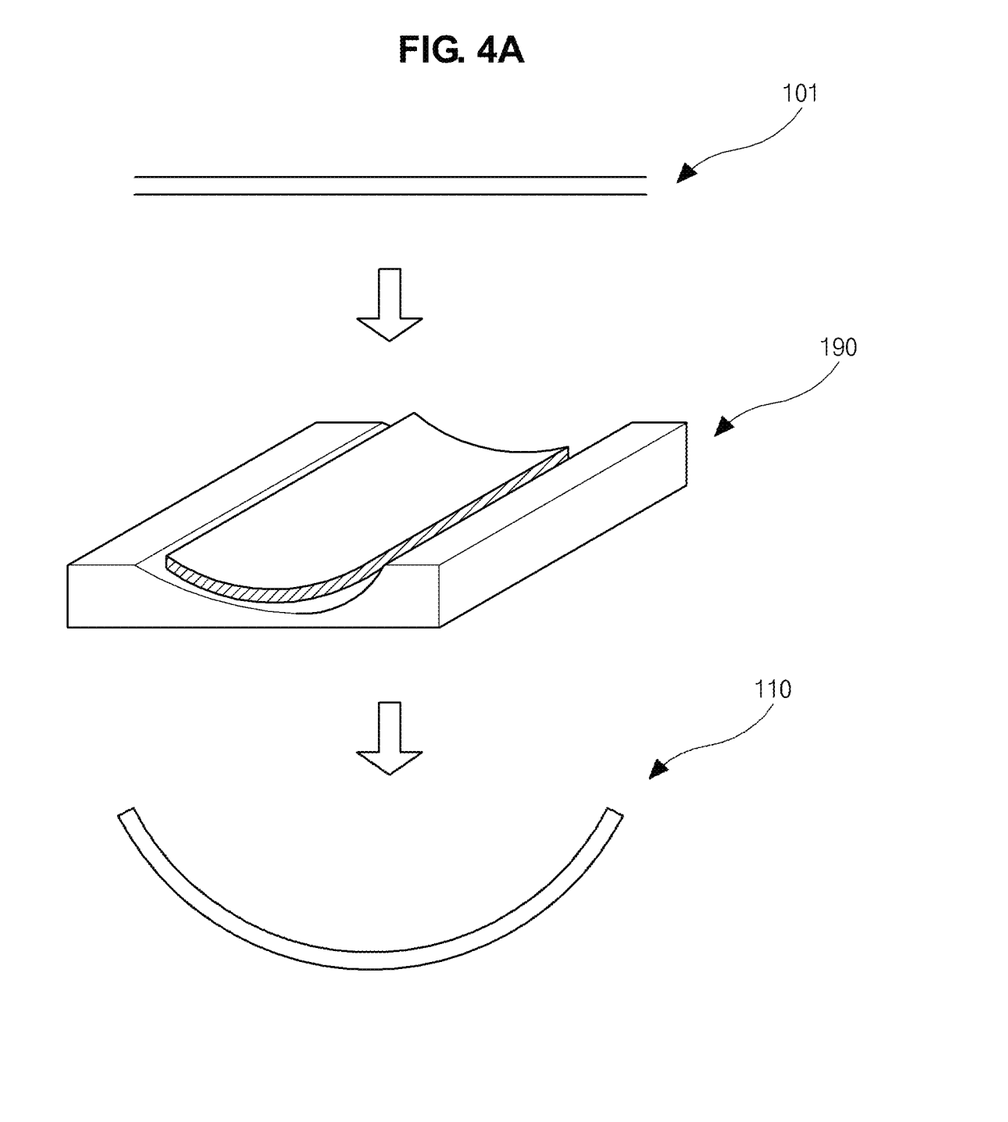
FIGS. 4A and 4B are views illustrating the possible light leakage problem in the curved LCD device according to the first embodiment of the present invention.
Figure 4B:
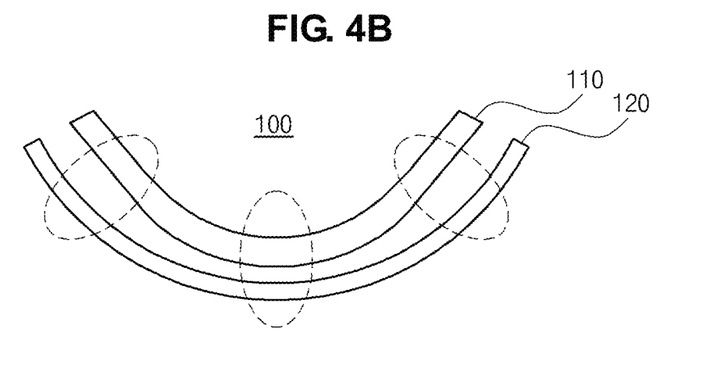

The light leakage problem is explained further with reference to FIGS. 4A and 4B. FIG. 4A is a schematic view showing a process of forming a liquid crystal panel for a curved LCD device, and FIG. 4B is a schematic view showing an interference between the liquid crystal panel and a frame.

The liquid crystal panel for the curved LCD device may be fabricated in a flat shape. Then, a curvature may be artificially provided to the flat liquid crystal panel. For example, as shown in FIG. 4A, the flat liquid crystal panel 101 is disposed on a concave portion of a jig 190 that has a pre-determined curvature, and an annealing process is performed. As a result, the liquid crystal panel 110 has a curvature.

Next, as shown in FIG. 4B, a bottom frame 120 is combined to cover a rear surface of the curved liquid crystal panel 110, such that the curved LCD device 100 is provided. In this example, the bottom frame 120 has the same curvature as the concave portion of the jig, and accommodates the liquid crystal panel 110 therein.

However, the curvature of the liquid crystal panel 110, which is fabricated by the process shown in FIG. 4A, is partially different from a reference curvature such that interference between the liquid crystal panel 110 and the bottom frame 120 is generated. Because of the interference between the liquid crystal panel 110 and the bottom frame 120, light leakage is generated in the curved LCD device 100.

For example, because the bottom frame 120 is fabricated to have the reference curvature, all portion of the bottom frame 120 have the same curvature. In other words, the bottom frame 120 has an arc shape of a circle. However, when the flat liquid crystal panel is artificially curved, the curvatures of the liquid crystal panel 110 may be different according to their positions. Accordingly, there is a curvature deviation between the liquid crystal panel 110 and the bottom frame 120 of the curved LCD device 100, and the interference between the liquid crystal panel 110 and the bottom frame 120 is partially generated.

For example, as shown in FIG. 4B, a physical interference between a portion of the bottom frame 120, which has the reference curvature, and a portion of the liquid crystal panel 110, which has a different curvature from the reference curvature, is generated such that a misorientation of the liquid crystal molecules is generated by the interference between the liquid crystal panel 110 and the bottom frame 120. The misorientation of the liquid crystal molecules may be strongly generated at the four corners of the liquid crystal panel 110, such that the light leakage is also strongly generated at the four corners, as shown by example in FIG. 3.

Figure 5:
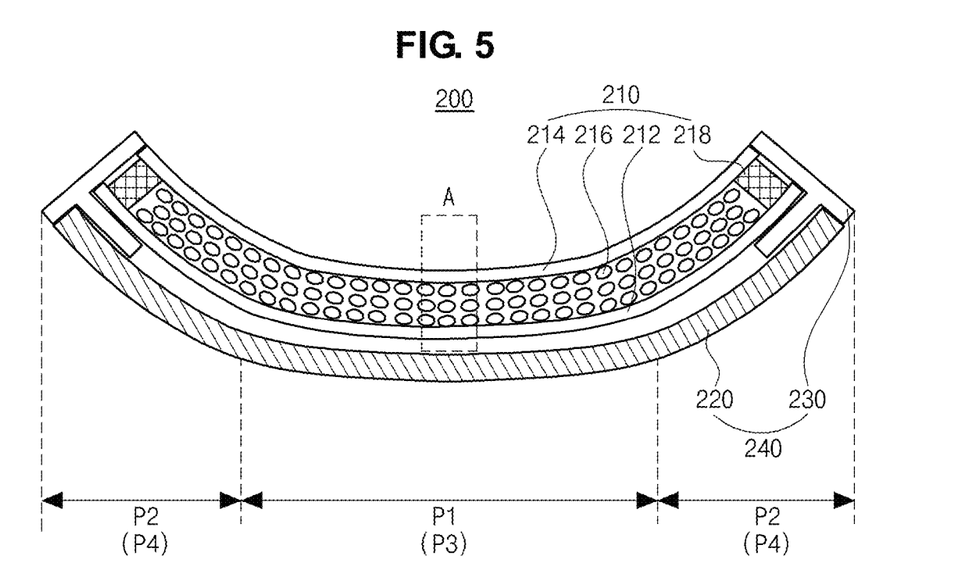
FIG. 5 is a schematic cross-sectional view of a curved LCD device according to a second embodiment of the present invention.
Figure 6:
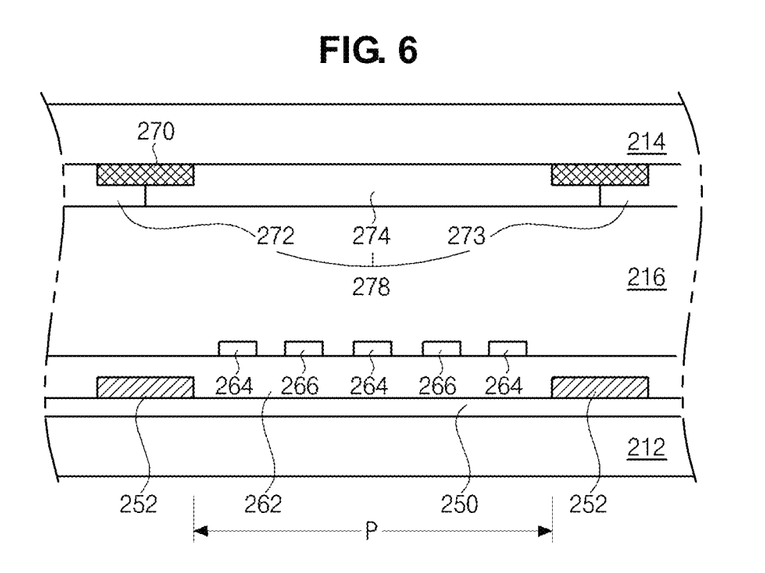
FIG. 6 is an enlarged view of the portion "A" of FIG. 5.
Figure 7:
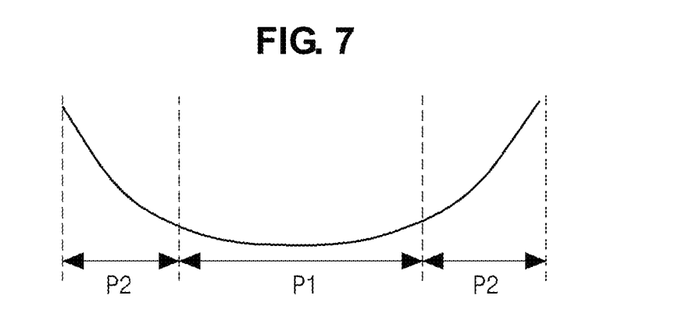
FIG. 7 is a view illustrating a curvature of the curved LCD device according to the second embodiment of the present invention.

FIG. 5 is a schematic cross-sectional view of a curved LCD device according to a second embodiment of the present invention, and FIG. 6 is an enlarged view of the portion "A" in FIG. 5. FIG. 7 is a view illustrating a curvature of the curved LCD device according to the second embodiment of the present invention.

As shown in FIG. 5, a curved LCD device 200 according to the second embodiment of the present invention may include a liquid crystal panel 210 of a curved state, and a frame 240 supporting and accommodating the liquid crystal panel 210.

The liquid crystal panel 210 may include first and second substrates 212 and 214, which are spaced apart from each other, a liquid crystal layer 216 therebetween, and a seal pattern 218 at edges of the first and second substrates 212 and 214. The leakage of the liquid crystal layer 216 is prevented by the seal pattern 218.

With reference to FIG. 6, a data line 252, a common electrode 264, and a pixel electrode 266 are formed on the first substrate 212 as a lower substrate, and a black matrix 270 and a color filter layer 278 are formed on the second substrate 214 as an upper substrate.

In more detail, a gate line (not shown), which extends along a direction, and a gate electrode (not shown), which is connected to the gate line, are formed on the first substrate 212, and a gate insulating layer 250 is formed to cover the gate line and the gate electrode. A common line (not shown) may be further formed to be parallel to the gate line.

In addition, a semiconductor layer (not shown) corresponding to the gate electrode is formed on the gate insulating layer 250, and a source electrode (not shown) and a drain electrode (not shown), which are spaced apart from each other, are formed on the semiconductor layer. For example, the semiconductor layer may include an active layer of intrinsic amorphous silicon and an ohmic contact layer of impurity-doped amorphous silicon. Alternatively, the semiconductor layer may be formed of an oxide semiconductor material.

The gate electrode, the gate insulating layer, the semiconductor layer, the source electrode, and the drain electrode may constitute a thin film transistor (TFT).

Moreover, the data line 252 is formed on the gate insulating layer 250. The data line 252 crosses the gate line to define a pixel region P. In other words, the gate line and the data line 252 extend along boundaries of the pixel region P.

The data line 252 is connected to the source electrode. For example, the TFT is connected to the gate line and the data line 252. A passivation layer 262 is formed to cover the TFT and the data line 252, and includes a drain contact hole (not shown) exposing the drain electrode of the TFT.

The common electrode 264 and the pixel electrode 266 are formed on the passivation layer 262. The common electrode 264 and the pixel electrode 266 have a bar shape and are alternately arranged.

A common contact hole (not shown), which exposes the common line, may be formed through the gate insulating layer 250 and the passivation layer 262, and the common electrode 264 may be connected to the common line through the common contact hole. The pixel electrode 266 is connected to the drain electrode through the drain contact hole.

In FIG. 6, the common electrode 264 and the pixel electrode 266 are alternately arranged and disposed on the passivation layer 262. However, a position and a shape of the common electrode 264 and the pixel electrode 266 are not limited thereto.

For example, the common electrode and the pixel electrode may be disposed in a different layer. In this instance, the lower one of the common electrode and the pixel electrode may have a plate shape, and the upper one of the common electrode and the pixel electrode may include at least one opening. Alternatively, the pixel electrode may be formed on the first substrate, and the common electrode may be formed on the second substrate.

The black matrix 270 and the color filter layer 278 are formed on the second substrate 214. The black matrix 270 has a lattice shape and includes an opening in correspondence to the pixel region P. For example, the black matrix 270 is positioned to overlap the data line 252 and the gate line.

The color filter layer 278 is disposed in the opening of the black matrix 270. For example, the color filter layer 278 corresponds to the pixel region P. As an example, the color filter layer 278 may include a red color filter pattern 272, a green color filter pattern 273, and a blue color filter pattern 274.

Although not shown, first and second polarization plates may be disposed at an outer side of the first and second substrates 212 and 214, respectively. A polarization axis of the first polarization plate is perpendicular to a polarization axis of the second polarization plate.

The edge of the liquid crystal panel 210 is curved along a direction from the first substrate 212 to the second substrate 214 such that the liquid crystal panel 210 has a curved state or shape along a major axis. Alternatively, the liquid crystal panel 210 may have the curved state along a minor axis.

With reference again to FIG. 5, the frame 240, which supports and accommodates the liquid crystal panel 210, includes a bottom frame 220 covering a rear surface of the liquid crystal panel 210, and a side frame 230 covering a side surface of the liquid crystal panel 210. The side frame 230 is coupled or combined with the bottom frame 220. The frame 240 may further include a top frame (not shown) covering a front edge of the liquid crystal panel 210 and coupled or combined with the side frame 230.

With reference to FIGS. 7 and 5, the liquid crystal panel has different curvatures in a first portion P1 at a center and second portions P2 at both sides of the first portion P 1.

A first curvature of the first portion P1 is larger than a reference curvature, and a second curvature of each second portion P2 is smaller than the reference curvature. For example, the second portions P2 may have a curve shape or a linear shape. Accordingly, the liquid crystal panel 210 may have a "U" shape or a rounded-vertex "V" shape.

In this example, the first portion P1 corresponds to about half (½) of a horizontal length of the liquid crystal panel 210, and each second portion P2 corresponds to about ¼ of the horizontal length of the liquid crystal panel 210.

Because the liquid crystal panel 210 has the curvatures, which are different from the reference curvature, at the center and the edges, there may be interference between the liquid crystal panel 210 and the frame 240, and (accordingly) light leakage in the curved LCD device 200 when the frame 240 has the reference curvature.

To prevent this problem, in the curved LCD device according to the second embodiment of the present invention, the frame 240, e.g., preferably the bottom frame 220, may also be fabricated to have different curvatures in a first portion P3 at a center and in second portions P4 at both sides of the center. For example, the bottom frame 220 has substantially the same shape as the liquid crystal panel 210.

In other words, in the bottom frame 220, a third curvature of the first portion P3 at the center is larger than the reference curvature, and a fourth curvature of each second portion P4 is smaller than the reference curvature. For example, the second portions P4 of the bottom frame 220 may have a curve shape or a linear shape. Accordingly, the bottom frame 220 may have a "U" shape or a rounded-vertex "V" shape.

The third curvature of the first portion P3 of the bottom frame 220 may be substantially equal to the first curvature of the first portion P1 of the liquid crystal panel 210, and the fourth curvature of the second portion P4 of the bottom frame 220 may be substantially equal to the second curvature of the second portion P2 of the liquid crystal panel 210.

In this example, the first portion P3 of the bottom frame 220 corresponds to about half of a horizontal length of the bottom frame 220, and each second portion P4 of the bottom frame 220 corresponds to about ¼ of the horizontal length of the bottom frame 220.

Although not shown, a backlight unit including a light source may be disposed between the liquid crystal panel 210 and the bottom frame 220. For example, the light source of the backlight unit may be arranged on a bottom surface of the bottom frame 220, and an optical sheet such as a diffusion plate may be disposed between the light source and the liquid crystal panel 210. Alternatively, the backlight unit may further include a light guide plate arranged on the bottom surface of the bottom frame 220 and an optical sheet disposed between the light guide plate and the liquid crystal panel 210, and the light source may be positioned at a side of the light guide plate. The backlight unit may further include a reflection plate under the light source or under the light guide plate. In a reflective type liquid crystal panel 210, the backlight unit may be emitted.

In the curved LCD device 200 according to the second embodiment of the present invention, because the bottom frame 220 accommodating the liquid crystal panel 210 (which has different curvatures in the center and the edges) also has different curvatures in the center and the edges, the interference between the liquid crystal panel 210 and the bottom frame 220 may be prevented. Accordingly, the light leakage in the curved LCD device 200 is reduced.

Figure 8:
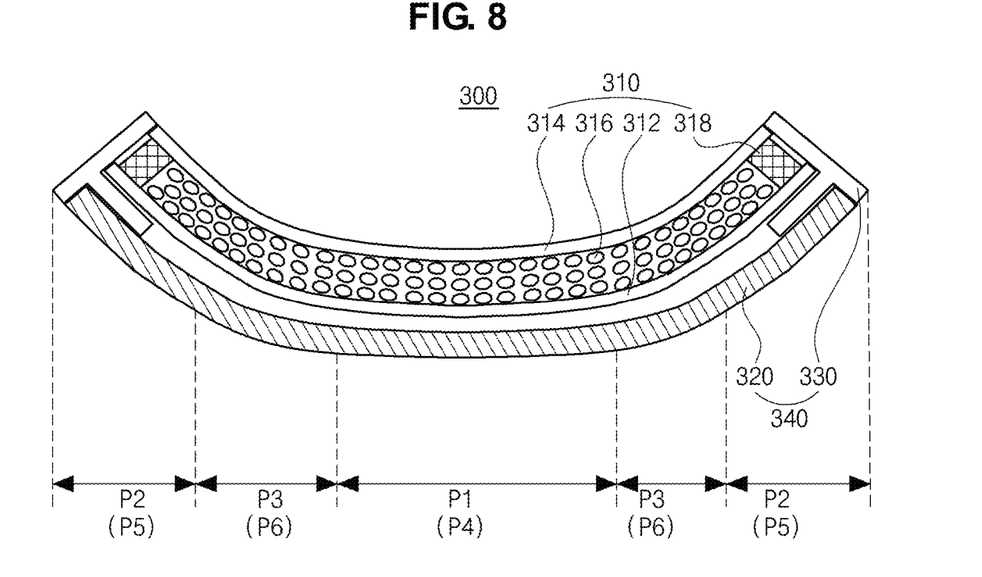
FIG. 8 is a schematic cross-sectional view of a curved LCD device according to a third embodiment of the present invention.
Figure 9:
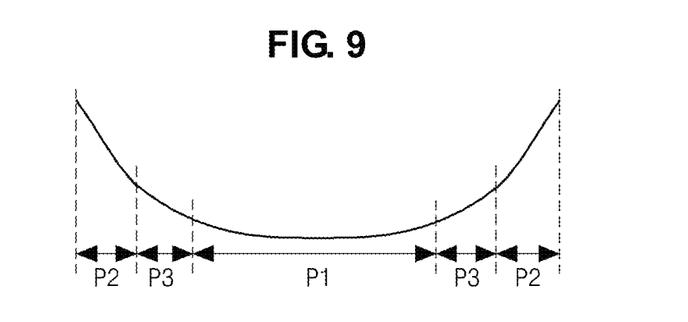
FIG. 9 is a view illustrating a curvature of the curved LCD device according to the third embodiment of the present invention.

FIG. 8 is a schematic cross-sectional view of a curved LCD device according to a third embodiment of the present invention, and FIG. 9 is a view illustrating a curvature of the curved LCD device according to the third embodiment of the present invention.

As shown in FIG. 8, a curved LCD device 300 according to the third embodiment of the present invention may include a liquid crystal panel 310 of a curved state, and a frame 340 supporting and accommodating the liquid crystal panel 310. The frame 340 includes a bottom frame 320 and a side frame 330.

The liquid crystal panel 310 includes first and second substrates 312 and 314, which are spaced apart from each other, a liquid crystal layer 316 therebetween, and a seal pattern 318 at edges of the first and second substrates 312 and 314. The leakage of the liquid crystal layer 316 is prevented by the seal pattern 318.

Although not shown, gate and data lines, which cross each other to define a pixel region, a TFT, which is connected to the gate and data lines, a pixel electrode, which is connected to the TFT, and a common electrode, which is alternately arranged with the pixel electrode, are formed on the first substrate 312. A black matrix and a color filter layer are formed on the second substrate 314. In addition, first and second polarization plates are disposed at an outer side of the first and second substrates 312 and 314, respectively.

In addition, the frame 340 may further include a top frame (not shown) covering a front edge of the liquid crystal panel 310 and being coupled or combined with the side frame 330. Moreover, the curved LCD device 300 may further include a backlight unit, which includes a light source, between the liquid crystal panel 310 and the bottom frame 320.

With reference to FIG. 9 and FIG. 8, the liquid crystal panel 310 has different curvatures in a first portion P1 at a center, in second portions P2 at both sides of the first portion P2, and in third portions P3 between the first portion P1 and each of the second portions P2.

A first curvature of the first portion P1 is larger than the reference curvature, a second curvature of each second portion P2 is smaller than the reference curvature, and a third curvature of each third portion P3 is smaller than the reference curvature and larger than the second curvature. The second portions P2 may have a curve shape or a linear shape. Accordingly, the liquid crystal panel 310 may have a "U" shape or a rounded-vertex "V" shape.

In this example, the first portion P1 corresponds to about ⅓ of a horizontal length of the liquid crystal panel 310, and each second portion P2 and each third portion P3 respectively corresponds to about ⅙ of the horizontal length of the liquid crystal panel 310.

Because the liquid crystal panel 310 has the curvatures, which are different from the reference curvature, at the above-discussed positions, there may be interference between the liquid crystal panel 310 and the frame 340, and (accordingly) light leakage in the curved LCD device 300 when the frame 340 has the reference curvature.

To prevent the above problems, in the curved LCD device according to the third embodiment of the present invention, the frame 340, e.g., preferably the bottom frame 320, may also be fabricated to have different curvatures in a first portion P4 at a center, in second portions P5 at both sides of the center, and in third portions P6 between the first portion P4 and each second portion P5. For example, the bottom frame 320 has substantially the same shape as the liquid crystal panel 310.

In other words, in the bottom frame 320, a fourth curvature of the first portion P4 at the center is larger than the reference curvature, a fifth curvature of each second portion P5 is smaller than the reference curvature, and a sixth curvature of each third portion P6 is smaller than the reference curvature and larger than the fifth curvature. For example, the second portions P5 of the bottom frame 320 may have a curve shape or a linear shape. Accordingly, the bottom frame 320 may have a "U" shape or a rounded-vertex "V" shape.

The fourth curvature of the first portion P4 of the bottom frame 320 may be substantially equal to the first curvature of the first portion P1 of the liquid crystal panel 310, and the fifth curvature of the second portion P5 of the bottom frame 320 may be substantially equal to the second curvature of the second portion P2 of the liquid crystal panel 310. In addition, the sixth curvature of the sixth portion P6 of the bottom frame 320 may be substantially equal to the third curvature of the third portion P3 of the liquid crystal panel 310.

In this example, the first portion P4 corresponds to about ⅓ of a horizontal length of the bottom frame 320, and each second portion P5 and each third portion P6 respectively corresponds to about ⅙ of the horizontal length of the bottom frame 320.

In the curved LCD device 300 according to the third embodiment of the present invention, because the bottom frame 320 accommodating the liquid crystal panel 310, which has different curvatures in the positions, also has different curvatures in the positions, the interference between the liquid crystal panel 310 and the bottom frame 320 may be prevented. Accordingly, the light leakage in the curved LCD device 300 is reduced.

On the other hand, when the curved LCD device is used for long time, the curved LCD device may become flat, such that interference between the liquid crystal panel and the frame may be generated again.

Figure 10A:
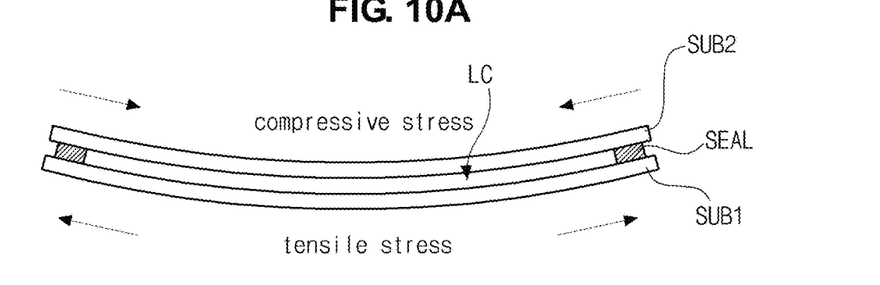
FIGS. 10A to 10D are view illustrating a length variation in a curved liquid crystal panel.

FIGS. 10A to 10D are views illustrating a length variation in a curved liquid crystal panel. With reference to FIG. 10A, a flat liquid crystal panel, which may include first and second substrates "SUB1" and "SUB2", which face each other, a liquid crystal layer "LC" therebetween, and a seal pattern "SEAL" at edges of the first and second substrates "SUB1" and "SUB2", is curved with a pre-determined curvature toward the second substrate "SUB2" along a major axis, e.g., a horizontal direction, to have a curved shape. However, because the edge of the first and second substrates "SUB1" and "SUB2" are attached using the seal pattern "SEAL", stress is applied onto the first and second substrates "SUB1" and "SUB2".

For example, in the curved LCD device, tensile stress is applied onto the first substrate "SUB1" at an outer side of the curved shape along the horizontal direction, and compressive stress is applied onto the second substrate "SUB2" at an inner side of the curved shape along the horizontal direction. As time goes by, a force of an opposite direction to the tensile stress is applied onto the first substrate "SUB1" of the liquid crystal panel "Panel", and a force of an opposite direction to the compressive stress is applied onto the second substrate "SUB2" of the liquid crystal panel "Panel".

Figure 10B:
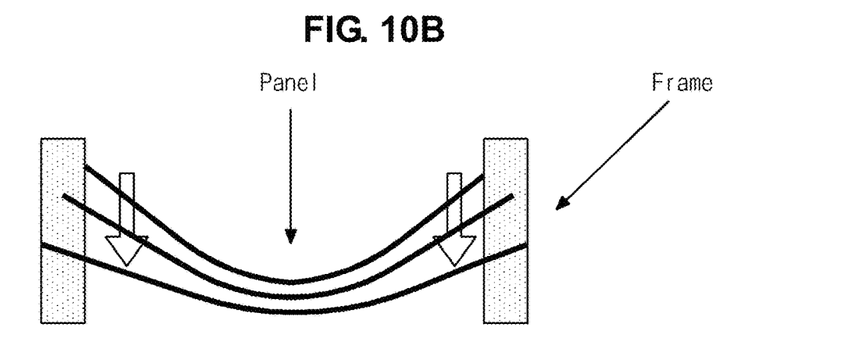
Figure 10C:
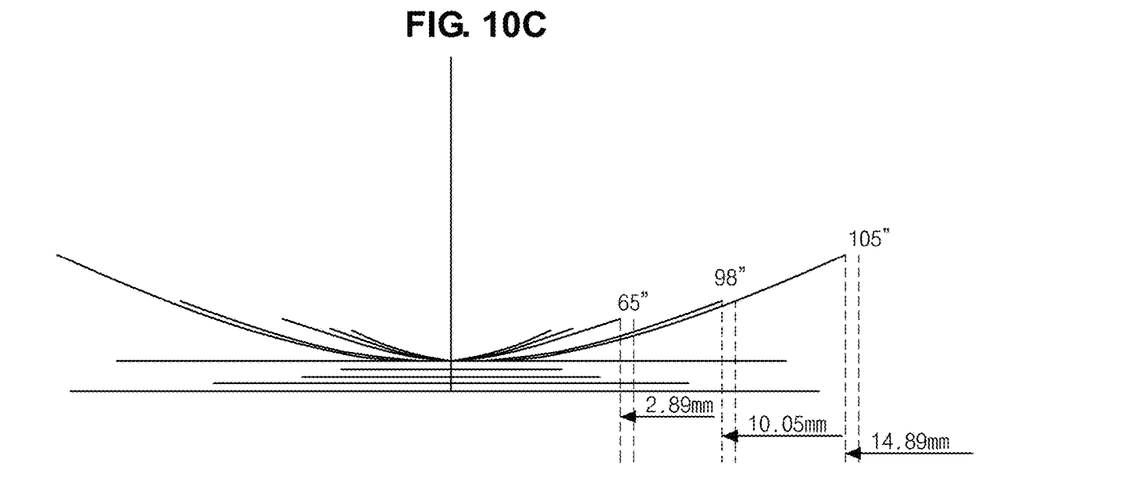
Figure 10D:
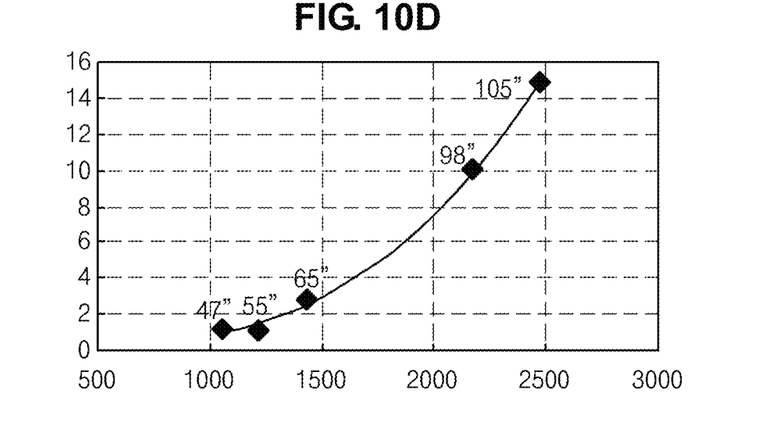

Accordingly, as shown in FIG. 10B, the curvature of the liquid crystal panel "Panel" is decreased such that interference between the liquid crystal panel "Panel" and the frame "frame" is generated. The decrease of the curvature of the liquid crystal panel "Panel" may cause the increase of a width of the liquid crystal panel "Panel." For example, as shown in FIGS. 10C and 10D, the length of the liquid crystal panel "Panel" is increased per the curvature of the liquid crystal panel "Panel" of the curved state, and the increasing length is proportional to a size and the curvature of the liquid crystal panel. In FIG. 10D, an x axis, e.g., a horizontal axis, is a horizontal length of the liquid crystal panel, and a y axis, e.g., a vertical axis, is an increasing length.

For example, when a 47 inch model curved liquid crystal panel becomes flat, the increased length is about 1.15 mm. When a 65 inch model curved liquid crystal panel becomes flat, the increased length is about 2.89 mm. When a 102 inch model curved liquid crystal panel becomes flat, the increased length is about 14.89 mm. (Similarly, for a 55 inch model: about 1.17 mm, and for a 98 inch model: about 10.05 mm.)

Accordingly, when the bottom frames 220 and 320 are fabricated to have the same curvature as the liquid crystal panels 210 and 310, as discussed in above examples of the second and third embodiments, there may be interference between the liquid crystal panels 210 and 310 and the side frames 230 and 330, and (accordingly) light leakage in the curved LCD devices 200 and 300.

Figure 11:
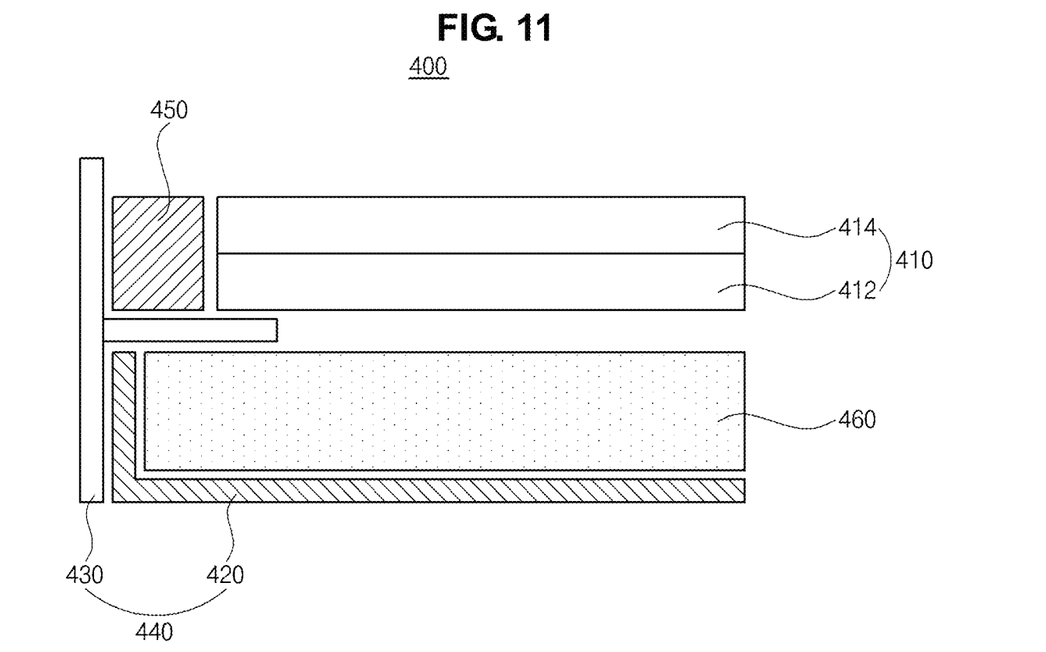
FIG. 11 is a schematic cross-sectional view of a curved LCD device according to a fourth embodiment of the present invention.
Figure 12:
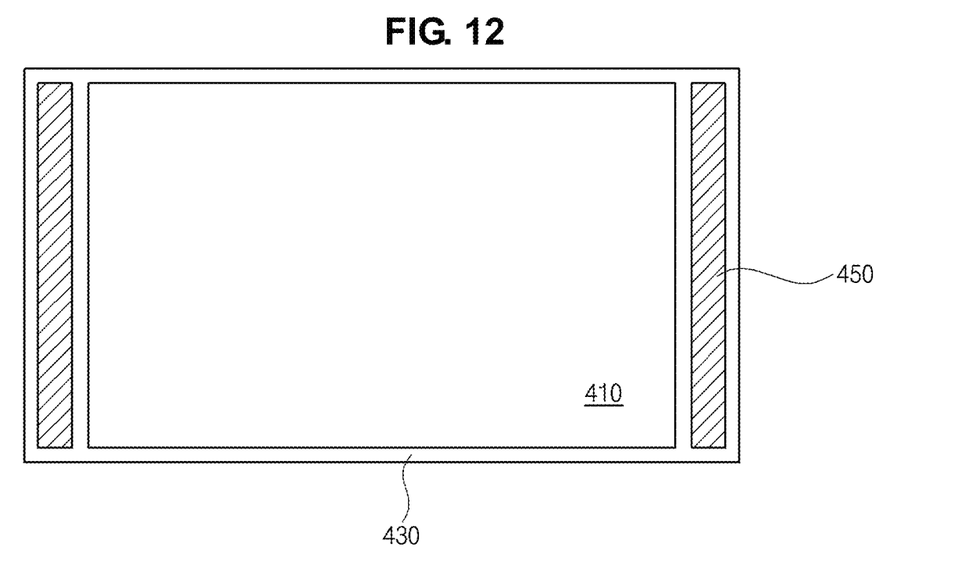
FIG. 12 is a schematic plane view of a curved LCD device according to the fourth embodiment of the present invention.

FIG. 11 is a schematic cross-sectional view of a curved LCD device according to a fourth embodiment of the present invention, and FIG. 12 is a schematic plane view of a curved LCD device according to the fourth embodiment of the present invention.

As shown in FIG. 11, a curved LCD device 400 according to the fourth embodiment of the present invention includes a liquid crystal panel 410, a backlight unit disposed under the liquid crystal panel 410, a frame 440, which includes a bottom frame 420 covering a rear surface of the backlight unit and a side frame 430 covering a side surface of the liquid crystal panel 410 and the backlight unit, and a cushion pad 450 between the side surface of the liquid crystal panel 410 and the side frame 430.

The liquid crystal panel 410 includes first and second substrates 412 and 414, which are spaced apart from each other, a liquid crystal layer (not shown) therebetween and a seal pattern (not shown) at edges of the first and second substrates 412 and 414. The leakage of the liquid crystal layer is prevented by the seal pattern.

Although not shown, gate and data lines, which cross each other to define a pixel region, a TFT, which is connected to the gate and data lines, a pixel electrode, which is connected to the TFT, and a common electrode, which is alternately arranged with the pixel electrode, are formed on the first substrate 412. A black matrix and a color filter layer are formed on the second substrate 414. In addition, first and second polarization plates are disposed at an outer side of the first and second substrates 412 and 414, respectively.

In addition, the frame 440 may further include a top frame (not shown) covering a front edge of the liquid crystal panel 410 and coupled or combined with the side frame 430.

The backlight unit is disposed under the liquid crystal panel 410 to provide the light onto the liquid crystal panel 410. The backlight unit includes a light guide plate 460 under the liquid crystal panel 410, a light source (not shown) at a side of the light guide plate 460, and an optical sheet (not shown) between the light guide plate 460 and the liquid crystal panel 410. The backlight unit may further include a reflection plate (not shown) under the light guide plate 460.

Alternatively, in the backlight unit, the light source may be arranged on a bottom surface of the bottom frame 420 without the light guide plate 460. In this example, the light from the light source is directly provided onto the liquid crystal panel 410.

The bottom frame 420 includes the bottom surface covering a rear surface of the light guide plate 460. The bottom frame 420 may further include a side surface, which upwardly extends from the bottom surface, and covers the side surface of the backlight unit.

Each of the liquid crystal panel 410 and the bottom frame 420 have a curved shape as illustrated by example in the first to third embodiments. In addition, each of the light guide plate 460 and the optical sheet (not shown) of the backlight unit has the same curved shape as the liquid crystal panel 410 and the bottom frame 420. Moreover, when the backlight unit includes the reflection plate (not shown), the reflection plate has the curved shape along the bottom frame 420.

For example, as illustrated with reference to FIG. 5, the first curvature of the first portion P1 of the liquid crystal panel 410 and the third curvature of the first portion P3 of the bottom frame 420 are larger than the reference curvature, and the second curvature of the second portion P2 of the liquid crystal panel 410 and the fourth curvature of the second portion P4 of the bottom frame 420 are smaller than the reference curvature.

Accordingly, although the liquid crystal panel 410 has a curved shape with different curvatures from the reference curvature, the interference between the liquid crystal panel 410 and the bottom frame 420 is prevented such that the light leakage is reduced.

Alternatively, as illustrated with reference to FIG. 8, the first curvature of the first portion P1 of the liquid crystal panel 410 is larger than the reference curvature, the second curvature of the second portion P2 of the liquid crystal panel 410 is smaller than the reference curvature, and the third curvature of the third portion P3 of the liquid crystal panel 410 is smaller than the reference curvature and larger than the second curvature. In addition, the fourth curvature of the first portion P4 of the bottom frame 420 is larger than the reference curvature, the fifth curvature of the second portion P5 of the bottom frame 420 is smaller than the reference curvature, and the sixth curvature of the third portion P6 of the bottom frame 420 is smaller than the reference curvature and larger than the fifth curvature.

Accordingly, although the liquid crystal panel 410 has a curved shape with different curvatures from the reference curvature, the interference between the liquid crystal panel 410 and the bottom frame 420 is prevented such that the light leakage is reduced.

The side frame 430 includes a vertical portion corresponding to the side surface of the liquid crystal panel 410 and the backlight unit, and a horizontal portion supporting the liquid crystal panel 410. The horizontal portion is positioned between the liquid crystal panel 410 and the backlight unit.

The vertical portion of the side frame 430 is spaced apart from the side surface of the liquid crystal panel 410 by a pre-determined distance, and the cushion pad 450 is disposed between the liquid crystal panel 410 and the vertical portion of the side frame 430.

With reference to FIG. 12, the cushion pad 450 may be disposed between each of both side surfaces of the liquid crystal panel 410 in one direction and the side frame 430. In this example, the one direction is a direction of the curvature in the liquid crystal panel 410. In FIG. 12, the cushion pad 450 is disposed at both end sides of the liquid crystal panel 410 in a major axis, e.g., a length direction or a horizontal direction. Alternatively, when the curvature is formed in the liquid crystal panel 410 along a minor axis, e.g., a width direction or a vertical direction, the cushion pad 450 may be disposed at both end sides of the liquid crystal panel 410 in the minor axis. In addition, to completely prevent the interference between the liquid crystal panel 410 and the side frame 430, the cushion pad 450 may be disposed at all sides of the liquid crystal panel 410.

The cushion pad 450 includes an elastic property material such that the length increase, generated when the curved LCD device becomes flat, is absorbed by the cushion pad 450. For example, the cushion pad 450 may include at least one of styrofoam or rubber.

For example, as explained with reference to FIGS. 10A to 10D, as time goes by, the curvature of the curved LCD device is decreased such that the length of the liquid crystal panel is increased. Accordingly, when the side frame is fabricated to correspond to a length of the curved-state liquid crystal panel, the interference between the liquid crystal panel and the side frame may be generated due to the length increase of the liquid crystal panel.

However, in the curved LCD device according to the fourth embodiment of the present invention, because the cushion pad 450 is disposed between the curvature direction end of the liquid crystal panel 410 and the side frame 430, the length increase of the liquid crystal panel 410 is absorbed by the cushion pad 450 such that the interference between the liquid crystal panel 410 and the side frame 430 is prevented. Accordingly, the light leakage problem in the curved LCD device may be minimized.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A curved liquid crystal display device, comprising:
    a liquid crystal panel including a first portion and second portions at both sides of the first portion along a width direction, the liquid crystal panel including first opposite ends along a first direction and second opposite ends along a second direction,
    wherein the first portion has a first curvature larger than a reference curvature along the width direction, and each of the second portions has a second curvature smaller than the reference curvature along the width direction; and
    a bottom frame covering a rear surface of the liquid crystal panel and including a third portion and fourth portions at both sides of the third portion along the width direction;
    a backlight unit disposed between the liquid crystal panel and the bottom frame and including a light source;
    a side frame including a vertical portion and a horizontal portion, the vertical portion covering the first opposite ends and the second opposite ends of the liquid crystal panel, and the horizontal portion disposed between the backlight unit and the liquid crystal panel; and
    a cushion pad positioned between the vertical portion and each of the first opposite ends of the liquid crystal panel and disposed on the horizontal portion,
    wherein the third portion has a third curvature larger than the reference curvature along the width direction, and each of the fourth portions has a fourth curvature smaller than the reference curvature along the width direction,
    wherein the cushion pads include an elastic property material, and
    wherein the second opposite ends of the liquid crystal panel face the side frame without the cushion pad,
    wherein the second curvature and the fourth curvature are zero such that each of the second portions and each of the fourth portions is flat, and
    wherein the first direction is the same as the width direction, and a thickness of the cushion pad is equal to a thickness of the liquid crystal panel.

2. The curved liquid crystal display device according to claim 1, wherein the first curvature is substantially equal to the third curvature, and the second curvature is substantially equal to the fourth curvature.

3. The curved liquid crystal display device according to claim 1, wherein the first portion corresponds to about ½ of a length of the liquid crystal panel, and each of the second portions corresponds to about ¼ of the length of the liquid crystal panel.

4. The curved liquid crystal display device according to claim 1, wherein the liquid crystal panel further includes fifth portions between the first portion and each of the second portions, and the bottom frame further includes sixth portions between the third portion and each of the fourth portions, and
    wherein the fifth portion has a fifth curvature smaller than the reference curvature and larger than the second curvature, and the sixth portion has a sixth curvature smaller than the reference curvature and larger than the fourth curvature.

5. The curved liquid crystal display device according to claim 4, wherein the first, second and fifth curvatures are substantially equal to the third, fourth and sixth curvatures, respectively.

6. The curved liquid crystal display device according to claim 4, wherein the first portion corresponds to about ⅓ of a length of the liquid crystal panel, each of the second portions corresponds to about ⅙ of the length of the liquid crystal panel, and each of the fifth portions corresponds to about ⅙ of the length of the liquid crystal panel.

7. The curved liquid crystal display device according to claim 1, wherein the backlight unit further includes a light guide plate under the liquid crystal panel, and the light source is positioned at a side of the light guide plate, and
    wherein the light guide plate has the same curved shape as the liquid crystal panel.

8. A curved display device, comprising:
    a display panel having a configuration with a first curvature and a second curvature at both sides of the first curvature, the display panel including first opposite ends along a first direction and second opposite ends along a second direction; and
    a bottom frame covering a rear surface of the display panel and including a third curvature and a fourth curvature at both sides of the third curvature;
    a backlight unit disposed between the liquid crystal panel and the bottom frame and including a light source;
    a side frame including a vertical portion and a horizontal portion, the vertical portion covering the first opposite ends and the second opposite ends of the display panel, and the horizontal portion disposed between the backlight unit and the liquid crystal panel; and
    an elastic material disposed between each of the first opposite ends of the display panel and the vertical portion and disposed on the horizontal portion,
    wherein the first curvature, the second curvature, the third curvature and the fourth curvature are formed in one direction,
    wherein the first curvature is larger than the second curvature and the third curvature is larger than the fourth curvature,
    wherein the second curvature and the fourth curvature are zero,
    wherein the second opposite ends of the liquid crystal panel face the side frame without the elastic material, and
    wherein the first direction is the same as a direction of the first curvature, and a thickness of the elastic material is equal to a thickness of the liquid crystal panel.

9. The curved display device according to claim 8, wherein the first curvature is substantially equal to the third curvature, and the second curvature is substantially equal to the fourth curvature.

10. The curved display device according to claim 8, wherein a length of the first curvature corresponds to about ½ of a length of the display panel, and a length of the second curvature at each of the sides of the first curvature corresponds to about ¼ of the length of the display panel.

11. An apparatus comprising:
a display panel having a vertical height and a horizontal length, the display panel comprising a pair of substrates with a liquid crystal layer sandwiched therebetween, the substrates being sealed together along edges thereof and having an array of pixels thereon, the display panel including first opposite ends along a first direction and second opposite ends along a second direction,
the display panel configured with a central region having a first curvature with respect to an axis along the vertical height, and with two side regions respectively at opposing sides of the central region along the horizontal length, each side region having a second curvature that is smaller than the first curvature;
a frame configured to accommodate the display panel by having substantially the same curved shape as the display panel having the first and second curvatures, and configured to accommodate a flattening tendency of the display panel, by having a cushion element made of foam or elastic material located between each of the first opposite ends of the display panel and the frame; and
a backlight unit disposed between the display panel and a bottom surface of the frame and including a light source,
wherein the second opposite ends of the display panel face the frame without the cushion element,
wherein the frame includes a vertical portion covering the first opposite ends and the second opposite ends of the display panel and a horizontal portion disposed between the backlight unit and the display panel, and the cushion element is disposed on the horizontal portion,
wherein the second curvature is zero, resulting in the two side regions being flat without any curvature, and
wherein the first direction is the same as a direction of the first curvature, and a thickness of the cushion element is equal to a thickness of the liquid crystal panel.

12. The curved liquid crystal display device according to claim 1, wherein each of the second portions includes a first end and a second end, which is positioned between the first end and the first portion, and a distance between the first ends is greater than a distance between the second ends.

13. The curved display device according to claim 8, wherein the display panel includes a first portion having the first curvature and a second portion having the second curvature, and
wherein each of the second portions includes a first end and a second end, which is positioned between the first end and the first portion, and a distance between the first ends is greater than a distance between the second ends.

14. The apparatus according to claim 11, wherein each of the two side regions includes a first end and a second end, which is positioned between the first end and the central region, and a distance between the first ends is greater than a distance between the second ends.

* * * * *